(12) United States Patent
Ochi et al.

(10) Patent No.: US 11,454,299 B2
(45) Date of Patent: Sep. 27, 2022

(54) TRANSMISSION BELT ELEMENT AND TRANSMISSION BELT

(71) Applicant: AISIN CORPORATION, Kariya (JP)

(72) Inventors: Akira Ochi, Anjo (JP); Wataru Ishihara, Anjo (JP); Takayuki Miyake, Okazaki (JP); Junichi Tokunaga, Anjo (JP)

(73) Assignee: AISIN CORPORATION, Kariya (JP)

( * ) Notice: Subject to any disclaimer, the term of this patent is extended or adjusted under 35 U.S.C. 154(b) by 309 days.

(21) Appl. No.: 16/612,436

(22) PCT Filed: Jun. 1, 2018

(86) PCT No.: PCT/JP2018/021130
§ 371 (c)(1),
(2) Date: Nov. 11, 2019

(87) PCT Pub. No.: WO2018/221714
PCT Pub. Date: Dec. 6, 2018

(65) Prior Publication Data
US 2020/0109765 A1 Apr. 9, 2020

(30) Foreign Application Priority Data

Jun. 2, 2017 (JP) .............................. JP2017-110435

(51) Int. Cl.
*F16G 5/16* (2006.01)
*F16H 9/12* (2006.01)
*F16G 5/18* (2006.01)

(52) U.S. Cl.
CPC ................. *F16G 5/16* (2013.01); *F16G 5/18* (2013.01); *F16H 9/12* (2013.01)

(58) Field of Classification Search
CPC ..... F16G 5/00; F16G 5/16; F16G 5/18; F16G 1/00; F16G 1/22; F16G 1/24; F16H 9/00;
(Continued)

(56) References Cited

U.S. PATENT DOCUMENTS 3,720,113 A * 3/1973 Doorne ..................... F16G 5/16
474/242
4,080,841 A * 3/1978 Vollers ....................... F16G 5/16
474/201
(Continued)

FOREIGN PATENT DOCUMENTS

EP 1544502 A1 * 6/2005 ............... F16G 5/16
JP 61-162637 U 10/1986
(Continued)

OTHER PUBLICATIONS

International Search Report of PCT/JP2018/021130 dated Jul. 10, 2018 [PCT/ISA/210], English Translation.

*Primary Examiner* — Michael R Mansen
*Assistant Examiner* — Raveen J Dias
(74) *Attorney, Agent, or Firm* — Sughrue Mion, PLLC

(57) ABSTRACT

An element for a transmission belt that is wound around a primary pulley and a secondary pulley of a continuously variable transmission includes: a trunk portion having a saddle surface that is in contact with a ring of the transmission belt; and a pair of pillar portions extending from the trunk portion so as to be positioned on both sides of the saddle surface in a width direction. The saddle surface is a convex surface that is formed by an elliptic arc and satisfies b/a≤0.015 when a long diameter of the elliptic arc is regarded as "a" and a short diameter of the elliptic arc is regarded as "b". In this way, it is possible to optimize the stress distribution of the ring that is in contact with the saddle surface and improve the durability of the ring and the transmission belt.

10 Claims, 5 Drawing Sheets

US 11,454,299 B2
Page 2

(58) Field of Classification Search
CPC ..... F16H 9/04; F16H 9/02; F16H 9/16; F16H 9/24; F16H 9/12
See application file for complete search history.

(56) References Cited

U.S. PATENT DOCUMENTS

| | | | | |
|---|---|---|---|---|
| 4,299,586 A * | 11/1981 | Van der Hardt Aberson | | F16G 5/16 474/201 |
| 4,303,403 A * | 12/1981 | Larners | | F16G 5/16 474/201 |
| 4,371,361 A * | 2/1983 | Giacosa | | F16G 5/16 474/201 |
| 4,433,965 A * | 2/1984 | Hattori | | F16G 5/16 474/201 |
| 4,465,469 A * | 8/1984 | Cataldo | | F16G 5/16 474/201 |
| 4,493,679 A * | 1/1985 | Miranti, Jr. | | F16G 5/16 474/201 |
| 4,525,160 A * | 6/1985 | Okawa | | F16G 5/16 474/201 |
| 4,526,559 A * | 7/1985 | Smirl | | F16G 5/16 474/201 |
| 4,612,005 A * | 9/1986 | Miranti, Jr. | | F16G 5/16 474/201 |
| 4,643,702 A * | 2/1987 | Cuypers | | F16G 5/16 474/242 |
| 4,645,478 A * | 2/1987 | Cuypers | | F16G 5/16 474/201 |
| 4,824,424 A * | 4/1989 | Ide | | F16G 5/16 474/201 |
| 4,894,049 A * | 1/1990 | Koppelaars | | F16G 5/16 474/240 |
| 4,976,663 A * | 12/1990 | Hendrikus | | F16G 5/16 474/242 |
| 5,123,880 A * | 6/1992 | Sekine | | F16H 9/24 474/244 |
| 5,152,722 A * | 10/1992 | Yamada | | F16G 5/16 474/240 |
| 6,334,831 B1 * | 1/2002 | Smeets | | F16G 5/16 474/201 |
| 6,342,020 B1 * | 1/2002 | Aoyama | | F16G 5/16 474/201 |
| 6,468,174 B1 * | 10/2002 | Brandsma | | F16G 5/16 474/242 |
| 6,679,798 B1 | 1/2004 | Takagi et al. | | |
| 6,830,525 B1 * | 12/2004 | Brandsma | | F16G 5/163 474/201 |
| 2002/0137585 A1 * | 9/2002 | Smeets | | F16G 5/163 474/242 |
| 2004/0053723 A1 * | 3/2004 | Smeets | | F16G 5/163 474/242 |
| 2004/0082417 A1 * | 4/2004 | Smeets | | F16G 5/16 474/242 |
| 2007/0072721 A1 | 3/2007 | Takagi et al. | | |
| 2009/0203478 A1 * | 8/2009 | Kobayashi | | F16G 5/16 474/242 |
| 2009/0258743 A1 * | 10/2009 | Kobayashi | | F16G 5/16 474/248 |
| 2010/0016112 A1 * | 1/2010 | Kobayashi | | F16G 5/16 474/255 |
| 2010/0016113 A1 * | 1/2010 | Kobayashi | | F16G 5/16 474/261 |
| 2010/0311531 A1 * | 12/2010 | Nishimi | | F16G 5/16 474/242 |
| 2011/0201467 A1 * | 8/2011 | Kobayashi | | F16G 5/16 474/240 |
| 2011/0237376 A1 * | 9/2011 | Sano | | F16G 5/16 474/242 |
| 2011/0300980 A1 * | 12/2011 | Kuwabara | | F16G 5/16 474/242 |
| 2012/0190490 A1 * | 7/2012 | Morino | | F16G 5/16 474/240 |
| 2018/0023664 A1 * | 1/2018 | Brans | | F16G 5/18 474/8 |
| 2019/0032750 A1 * | 1/2019 | Bran | | F16G 5/16 |
| 2019/0101183 A1 * | 4/2019 | Ninomiya | | F16G 5/00 |
| 2019/0101185 A1 * | 4/2019 | Ninomiya | | F16G 5/16 |
| 2019/0101186 A1 * | 4/2019 | Ninomiya | | F16G 5/16 |
| 2019/0101187 A1 * | 4/2019 | Ninomiya | | F16G 5/16 |
| 2019/0154112 A1 * | 5/2019 | Ochi | | F16G 5/16 |
| 2019/0154113 A1 * | 5/2019 | Sato | | F16G 5/16 |
| 2019/0195315 A1 * | 6/2019 | Ochi | | F16G 5/16 |
| 2019/0234486 A1 * | 8/2019 | Inase | | F16G 5/16 |
| 2019/0346016 A1 * | 11/2019 | Van Treijen | | F16G 5/16 |
| 2020/0011398 A1 * | 1/2020 | Nakamura | | F16G 5/16 |
| 2020/0096078 A1 * | 3/2020 | Miyake | | F16G 5/16 |
| 2020/0103000 A1 * | 4/2020 | Takahashi | | F16H 9/12 |
| 2020/0132160 A1 * | 4/2020 | Inase | | F16G 5/16 |
| 2020/0149610 A1 * | 5/2020 | Ochi | | F16G 5/16 |
| 2020/0300335 A1 * | 9/2020 | Ochi | | B21D 53/14 |
| 2021/0116001 A1 * | 4/2021 | Ishihara | | F16H 57/0456 |
| 2021/0140512 A1 * | 5/2021 | Ohata | | F16G 5/16 |
| 2021/0148439 A1 * | 5/2021 | Miyake | | F16G 5/16 |
| 2021/0172496 A1 * | 6/2021 | Van Der Meer | | F16G 5/16 |

FOREIGN PATENT DOCUMENTS

| | | | |
|---|---|---|---|
| JP | 2001-193796 A | 7/2001 | |
| JP | 2003-042235 A | 2/2003 | |
| WO | 2005/019684 A1 | 3/2005 | |
| WO | WO-2015177372 A1 * | 11/2015 | ............ F16G 5/16 |
| WO | 2017/138217 A1 | 8/2017 | |

* cited by examiner

TRANSMISSION BELT ELEMENT AND TRANSMISSION BELT

CROSS REFERENCE TO RELATED APPLICATIONS

This application is a National Stage of International Application No. PCT/JP2018/021130, filed Jun. 1, 2018, claiming priority to Japanese Patent Application No. 2017-110435, filed Jun. 2, 2017.

TECHNICAL FIELD

The disclosure relates to a transmission belt element and a transmission belt, the transmission belt element including a trunk portion having a saddle surface, and a pair of pillar portions extending from the trunk portion so as to be positioned on both sides of the saddle surface in a width direction.

BACKGROUND ART

Conventionally, a transmission belt for a continuously variable transmission that has a single endless metal band (ring), a plurality of elements made of metal, and a falling-out prevention body (retainer ring) made of metal that has a slightly wider width than the band is known as a transmission belt for a continuously variable transmission (see Patent Document 1). The elements of the transmission belt each include a pair of pillar portions extended upward from an upper end portion on both sides of a body portion (trunk portion) that forms a horizontal portion. A recessed portion for housing the band and the falling-out prevention body is formed between the pillar portions. A shoulder portion of the body portion on which the band is mounted, that is, the saddle surface, is formed to have an arc shape that is gradually protrudes upward so as to suppress the band from meandering to the left and right.

RELATED ART DOCUMENTS

Patent Documents

[Patent Document 1] Japanese Unexamined Patent Application Publication No. 2001-193796 (JP 2001-193796 A)

SUMMARY OF THE DISCLOSURE

The width of the saddle surface of the element including the pillar portions as described above is increased compared to a conventional element, due to the increased ring width which results from the number of rings being decreased from two to one. Here, the conventional element includes two saddle surfaces corresponding to two rings disposed on both sides of a head portion that extends from a center portion of a trunk portion in the width direction toward a belt outer peripheral side. Depending on a curvature of the saddle surface, a distance between a top portion and a bottom portion of the saddle surface is increased, which causes a stress (bending stress) that acts on the ring when a torque is transmitted with the transmission belt to be concentrated in the center portion of the ring in the width direction. Thus, there is a possibility that the durability of the ring is decreased.

An aspect of the disclosure is to optimize the stress distribution of a ring that is in contact with a saddle surface between a pair of pillar portions of a transmission belt element and improve the durability of the ring and the transmission belt.

A transmission belt element of the disclosure includes: a trunk portion having a saddle surface that is in contact with a ring of a transmission belt that is wound around a primary pulley and a secondary pulley of a continuously variable transmission; and a pair of pillar portions extending from the trunk portion so as to be positioned on both sides of the saddle surface in a width direction, in which the saddle surface is a convex surface that is formed by an elliptic arc and satisfies $b/a \leq 0.015$ when a long diameter of the elliptic arc is regarded as "a" and a short diameter of the elliptic arc is regarded as "b".

Intensive research was carried out to optimize a curvature of the saddle surface of the element including the pillar portions and improve the durability of the transmission belt and the ring of the continuously variable transmission including the element. As a result, it is found that it is possible to suppress a distance between a top portion and a bottom portion of the saddle surface from becoming too large so as to optimize the stress distribution of the ring when a torque is transmitted with the transmission belt. This is made possible by setting the saddle surface as a convex surface that is formed by the elliptic arc in which the long diameter a and the short diameter b satisfy $b/a \leq 0.015$. It is thus possible to optimize the stress distribution of the ring that is in contact with the saddle surface and improve the durability of the transmission belt. This is made possible by setting the saddle surface of the transmission belt element including the pillar portions as the convex surface formed by the elliptic arc in which the long diameter a and the short diameter b satisfy $b/a \leq 0.015$.

DETAILED DESCRIPTION

Modes for carrying out the various aspects of the disclosure will be described below with reference to the drawings.

Figure 1:
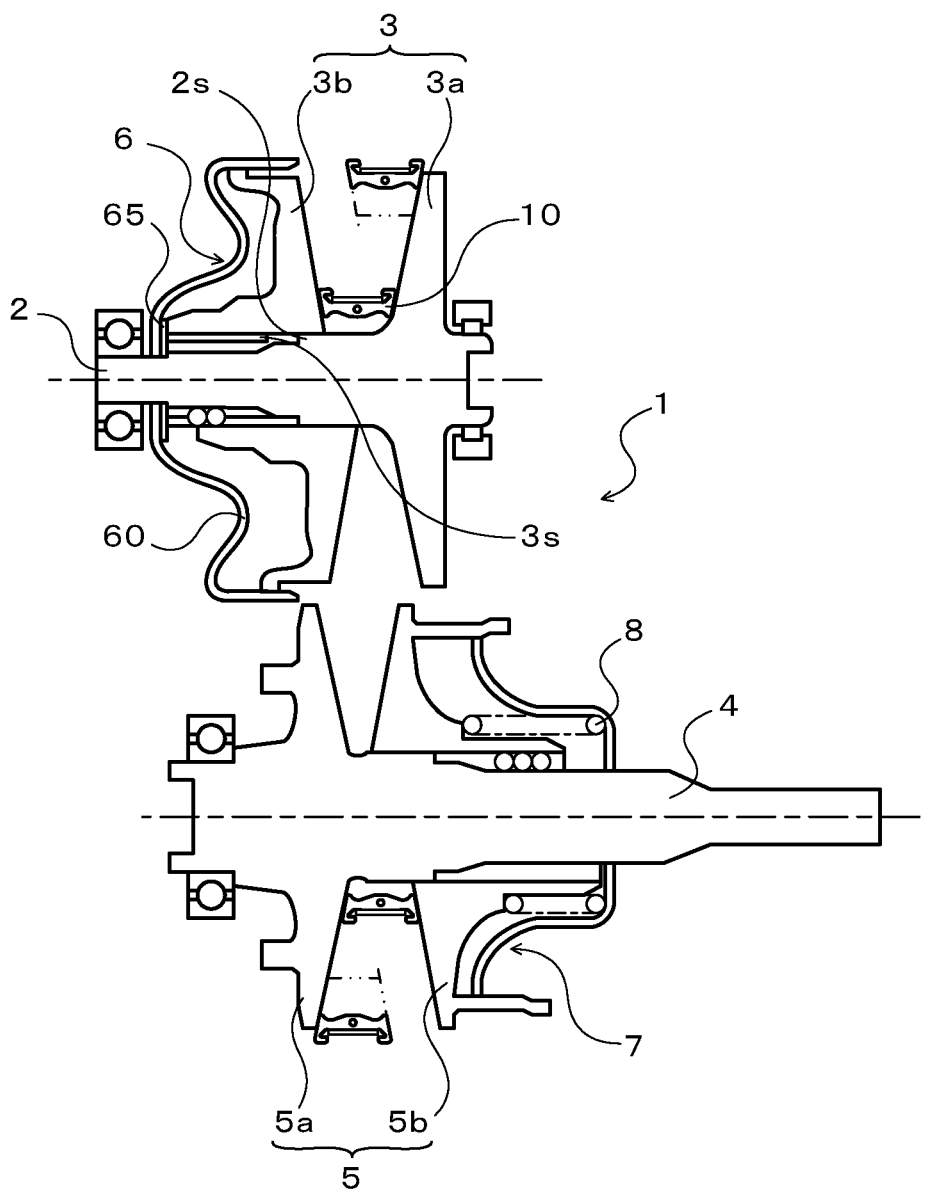
FIG. 1 is a schematic configuration diagram of an example of a continuously variable transmission including a transmission belt of the disclosure.

FIG. 1 is a schematic configuration diagram of a continuously variable transmission (CVT) 1 of the disclosure. The continuously variable transmission 1 illustrated in FIG. 1 is installed in a vehicle and includes: a primary shaft (first shaft) 2 that serves as a driving rotary shaft; a primary pulley (first pulley) 3 disposed in the primary shaft 2; a secondary shaft (second shaft) 4 serving as a driven rotary shaft and disposed on parallel with the primary shaft 2; a secondary pulley (second pulley) 5 disposed in the secondary shaft 4;

and a transmission belt 10. As shown in the figure, the transmission belt 10 is wound around a pulley groove (V-shaped groove) of the primary pulley 3 and a pulley groove (V-shaped groove) of the secondary pulley 5.

The primary shaft 2 is coupled to an input shaft (not shown) via a front/reverse switching mechanism not shown. The input shaft is coupled to a power generation source such as an engine (internal combustion engine) of the vehicle. The primary pulley 3 includes a fixed sheave 3a formed integrally with the primary shaft 2, and a movable sheave 3b supported by the primary shaft 2 via a ball spline etc. so as to be slidable in an axial direction. The secondary pulley 5 includes a fixed sheave 5a formed integrally with the secondary shaft 4, and a movable sheave 5b supported by the secondary shaft 4 via a ball spline etc. so as to be slidable in the axial direction and urged in the axial direction by a return spring 8.

The continuously variable transmission 1 includes a primary cylinder 6 that is a hydraulic actuator that changes a width of a groove of the primary pulley 3, and a secondary cylinder 7 that is a hydraulic actuator that changes a width of a groove of the secondary pulley 5. The primary cylinder 6 is formed behind the movable sheave 3b of the primary pulley 3. The secondary cylinder 7 is formed behind the movable sheave 5b of the secondary pulley 5. Working oil is supplied from a hydraulic control device that is not shown to the primary cylinder 6 and the secondary cylinder 7 in order to change the width of the grooves of the primary pulley 3 and the secondary pulley 5. The secondary shaft 4 is coupled to driving wheels of the vehicle via a gear mechanism, a differential gear, and a drive shaft (all not shown).

In the embodiment, a step portion is formed on an end portion (end portion on left side in FIG. 1) on the opposite side of the primary shaft 2 from the engine side. An annular end plate 65 is interposed between the step portion and the primary piston 60 of the primary cylinder 6 so that the end plate 65 can abut against the end portion (end portion on left side in FIG. 1) on the opposite side of the movable sheave 3b of the primary pulley 3 from the engine side. A stopper portion 2s is formed in the primary shaft 2 so that the stopper portion 2s can abut against an end portion on the fixed sheave 3a side of a spline tooth 3s formed on an inner peripheral surface of the movable sheave 3b.

When the movable sheave 3b of the primary pulley 3 is spaced away from the fixed sheave 3a and is abutted against the end plate 65, movement of the movable sheave 3b in a direction away from the fixed sheave 3a with respect to the primary shaft 2 is restricted. In this way, the width of the pulley groove of the primary pulley 3 is maximized and consequently the width of the pulley groove of the secondary pulley 5 is set to the minimum, and a speed ratio γ of the continuously variable transmission 1 is maximized. When the spline tooth 3s formed on the inner peripheral surface of the movable sheave 3b abuts against the stopper portion 2s formed in the primary shaft 2, movement of the movable sheave 3b in a direction toward the fixed sheave 3a with respect to the primary shaft 2 is restricted. In this way, the width of the pulley groove of the primary pulley 3 is minimized and consequently the width of the pulley groove of the secondary pulley 5 is set to the maximum with the transmission belt 10, and the speed ratio γ of the continuously variable transmission 1 is minimized.

Figure 2:
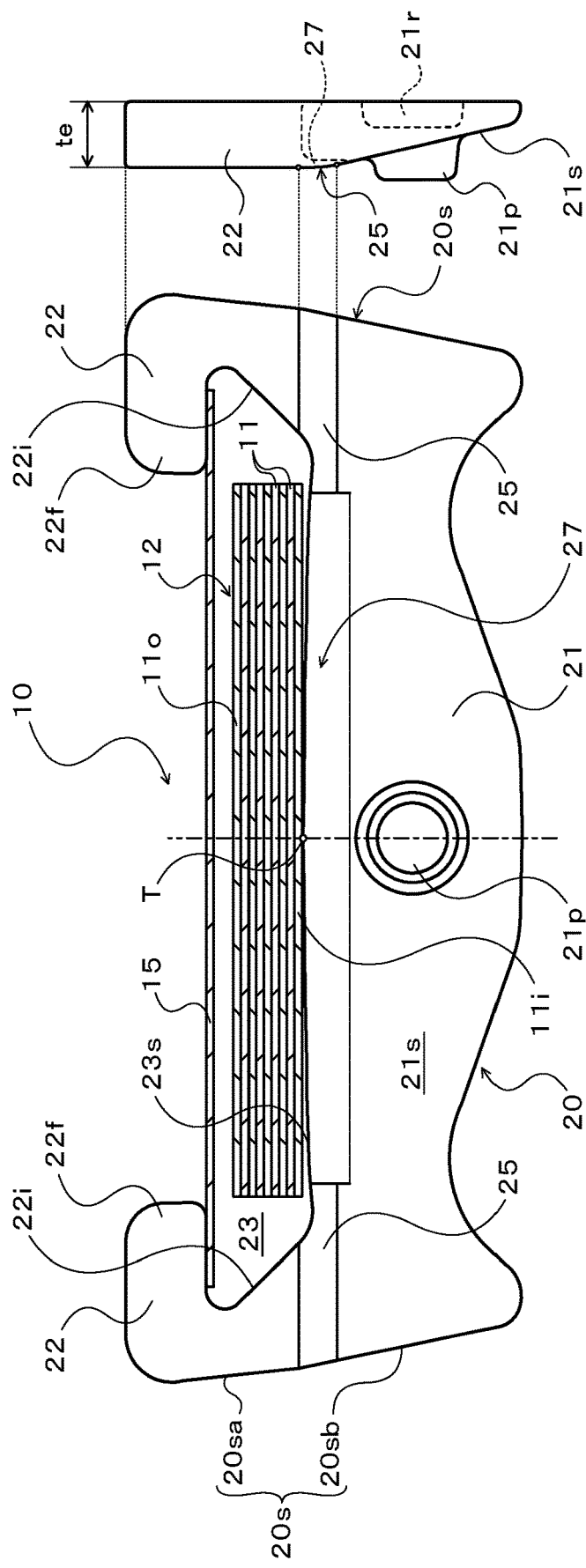
FIG. 2 is a schematic configuration diagram of the transmission belt of the disclosure.

FIG. 2 is a schematic configuration diagram of the transmission belt 10. As illustrated in FIG. 2, the transmission belt 10 includes a laminated ring 12 configured by laminating a plurality of (for example, nine in the embodiment) elastically deformable ring materials 11 in a thickness direction (ring radial direction), a retainer ring 15, and a plurality of (for example, several hundred) elements 20 annularly arranged (bound) along an inner peripheral surface of the laminated ring 12. In the embodiment, the element 20 includes a first element, and a second element that has a thickness (maximum thickness) that is slightly thicker (for example, by around 0.1 mm) than that of the first element. A plurality of the first and second elements are arranged side by side. It is thus possible to suppress vibration and noise from being generated when a torque is transmitted between the primary pulley 3 and the secondary pulley 5 with the transmission belt 10. Since the first and second elements have common structures except for their thickness, hereinafter, the first and second elements will be described by being collectively called the "elements 20".

A plurality of the ring materials 11 that configure the laminated ring 12 are elastically deformable ring materials 11 that are cut out from a drum made of a steel plate. The ring materials 11 are machined so as to have substantially the same thickness and different circumferences that are prescribed for each one. The retainer ring 15 is an elastically deformable ring that is cut out from a drum made of a steel plate for example, and has a thickness that is substantially the same as or thinner than that of the ring materials 11. The retainer ring 15 has an inner circumference that is longer than an outer circumference of an outermost layer ring material 11o of the laminated ring 12. In this way, when the laminated ring 12 and the retainer ring 15 are disposed concentrically (non-load state in which tensile force is not applied), an annular clearance is formed between an outer peripheral surface of the outermost layer ring material 11o and an inner peripheral surface of the retainer ring 15, as illustrated in FIG. 2.

Each element 20 has a symmetrical outer shape punched out from a steel plate by press working. As illustrated in FIG. 2, the element 20 includes a trunk portion 21 extending horizontally in the drawing, a pair of pillar portions 22 extending from both sides of the trunk portion 21 in the same direction, and a single ring housing portion (recessed portion) 23 that is defined between the pillar portions 22 so as to open toward a free end side of each pillar portion 22. The element 20 also includes a pair of side faces 20s that are formed so as to be spaced away from each other as the side faces 20s extend from an inner peripheral side to an outer peripheral side (radially outward of the laminated ring 12) of the transmission belt 10 (laminated ring 12).

The pillar portions 22 extend from both sides of the saddle surface 23s in the width direction and extends radially outward of the laminated ring 12 (in a direction from the inner peripheral side toward the outer peripheral side of the transmission belt 10 (laminated ring 12), that is, upward in the figure). The saddle surface 23s is a bottom surface of the ring housing portion 23. On the free end portion of each pillar portion 22, a hook portion 22f that extends in the width direction of the saddle surface 23s is formed. A pair of the hook portions 22f face each other while being spaced away from each other at an interval that is slightly longer than the width of the laminated ring 12 (ring material 11) and that is shorter than the width of the retainer ring 15. Each pillar portion 22 of the element 20 includes a flat inner surface 22i that is inclined so as to be spaced away from the saddle surface 23s as it extends radially outward of the laminated ring 12. Between the saddle surface 23s and the inner surface 22i of the pillar portion 22, a concave surface (for example, a concave cylindrical surface) that is smoothly continuous with the saddle surface 23s and the inner surface 22i is formed.

Figure 3:
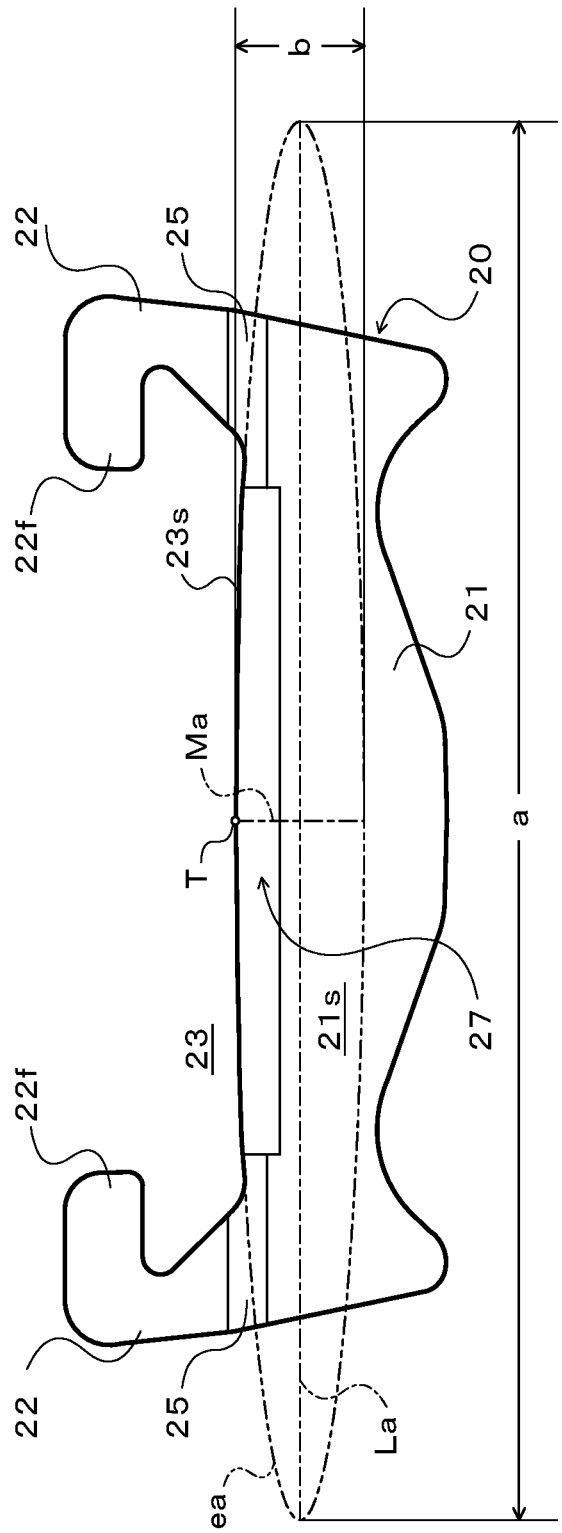
FIG. 3 is a schematic diagram of an element for the transmission belt.

As illustrated in FIG. 2, the laminated ring 12 is disposed in the ring housing portion 23 and the saddle surface 23s of the ring housing portion 23 is in contact with the laminated ring 12, that is, an inner peripheral surface of an innermost layer ring material 11i. The saddle surface 23s has a symmetrical convex surface shape (crowned shape) that is gradually inclined downward in the figure as it extends toward the outer side in the width direction with a central portion in the width direction serving as a top portion T. In the embodiment, as illustrated in FIG. 3, the saddle surface 23s is a convex surface (elliptical cylindrical surface) that is formed of an elliptic arc ea. In the elliptic arc ea, a ratio b/a of a long diameter a and a short diameter b is set to be relatively small and a long axis La of the elliptic arc ea extends in the width direction of the saddle surface 23s (element 20). A short axis Ma of the elliptic arc ea extends through the center of the element 20 in the width direction. An intersection of the elliptic arc ea and the short axis Ma forms the top portion T of the saddle surface 23s. Corner portions on a front face side and a rear face side of the saddle surface 23c are chamfered so as to have a convex surface shape (so as to be rounded). In this way, it is possible to center the laminated ring 12 by applying a centripetal force towards the top portion T to the laminated ring 12 by friction with the saddle surface 23s.

The retainer ring 15 that is elastically deformed is fitted in the ring housing portion 23 between the hook portions 22f of each element 20. The retainer ring 15 is disposed between the outer peripheral surface of the outermost layer ring material 11o of the laminated ring 12 and the hook portions 22f of the element 20 so as to surround the laminated ring 12. With the pillar portions 22, the retainer ring 15 restricts the element 20 from falling out of the laminated ring 12 and restricts the laminated ring 12 from falling out of the element 20. The elements 20 are thus annularly bound (arranged) along the inner peripheral surface of the laminated ring 12. In the embodiment, a single or a plurality of openings (long holes) not shown are formed in the retainer ring 15. In this way, it is possible to make the retainer ring 15 easily elastically deformable and ensure an assembling property of the retainer ring 15 to the elements 20.

Each side face 20s of the element 20 includes a first side face 20sa positioned on the pillar portion 22 side, that is, the opposite side (outer side) of the pillar portion 22 from the inner surface 22i, and a second side face 20sb formed so as to be continuous with the first side face 20sa and positioned on the inner side of the first side face 20sa in the radial direction of the laminated ring 12. In the embodiment, a pair of the first side faces 20sa are formed so as to be spaced away from each other as they extend radially outward of the laminated ring 12, similar to the second side faces 20sb. It is thus possible to satisfactorily ensure the strength of the pillar portion 22.

An angle formed by a pair of the second side faces 20sb is set to be nearly equal to an opening angle of the pulley groove of the primary pulley 3 and the secondary pulley 5 (slightly larger than a set value of the opening angle, in the embodiment). An angle formed by a pair of the first side faces 20sa is set to be smaller than the angle formed by the second side faces 20sb. The second side faces 20sb of the element 20 are in frictional contact with the surface of the pulley groove of the primary pulley 3 and the pulley groove of the secondary pulley 5, receive a holding force from the pulleys 3, 5, and become torque transmitting faces (flank faces) that transmit a torque from the primary pulley 3 to the secondary pulley 5 with friction. In contrast, the first side faces 20sa are basically not in contact with the surface of the pulley groove, when a torque is transmitted from the primary pulley 3 to the secondary pulley 5 with the transmission belt 10. On the surface of each second side face 20sb, recesses and projections (a plurality of grooves) not shown are formed, in which the recesses and the projections are for holding hydraulic oil for lubricating and cooling a contact portion of the element 20 and the primary pulley 3 or the secondary pulley 5.

As illustrated in FIG. 2, on a front face (one of the surfaces) of the element 20, a pair of rocking edge portions (contact region) 25, a non-contact portion 27, a tapered surface (inclined surface) 21s, and a protrusion (dimple) 21p are formed. The rocking edge portions 25 are formed on the front face of the element 20 and are spaced away from each other in the width direction of the saddle surface 23s so as to be extended over the corresponding pillar portion 22 and the trunk portion 21. The non-contact portion 27 is formed between the rocking edge portions 25 in the width direction described above. In the embodiment, an edge portion on a belt inner peripheral side of the non-contact portion 27 (lower edge portion in FIG. 2) is positioned on a belt inner peripheral side (lower side in the figure) of an edge portion of the belt inner peripheral side of the rocking edge portion 25 (lower edge portion in FIG. 2). The tapered surface 21s is formed on the front face (one of the surfaces) of the trunk portion 21 so as to extend from the non-contact portion 27 and the rocking edge portions 25 to the opposite side of a protruding direction of the pillar portions 22, that is, so as to extend toward the belt inner peripheral side (lower side in FIG. 2). The protrusion 21p protrudes from the tapered surface 21s in the central portion on the front face of the trunk portion 21 in the width direction.

In the embodiment, the front face of the element 20 (mainly the front face of the pillar portion 22) that is positioned on a belt outer peripheral side of the rocking edge portion 25 and the non-contact portion 27, and a rear face of the element 20 (other face) are each formed to be flat, as illustrated in FIG. 3. The pillar portion 22 of the element 20 has a generally constant thickness te. As illustrated in FIG. 3, the tapered surface 21s that is positioned on the belt inner peripheral side (lower side in FIGS. 2 and 3) of the rocking edge portion 25 and the non-contact portion 27 is brought closer to the rear face (back face) as the tapered surface 21s extends away from the pillar portion 22 (as the tapered surface 21s extends toward the belt inner peripheral side). On the rear face of the element 20 (trunk portion 21), a recessed portion 21r is formed so as to be positioned on the back side of the protrusion 21p. When the transmission belt 10 is assembled, the protrusion 21p of the adjacent element 20 is loosely fitted in the recessed portion 21r.

The rocking edge portion 25 is a convex surface that has a short belt shape. In the embodiment, the rocking edge portion 25 is a cylindrical surface (curved surface) having a predetermined curvature radius and a width in the radial direction. The rocking edge portion 25 includes a contact line at which the adjacent elements 20 are in contact with each other and which serves as a fulcrum of rotation of the adjacent elements 20. A position of the contact line varies within a range of the rocking edge portion 25 based on the speed ratio γ of the continuously variable transmission 1. In the embodiment, an end portion of the rocking edge portion 25 on the outer peripheral side of the transmission belt 10 (upper side in the figure, that is, the pillar portion 22 side) is positioned on the outer side of the saddle surface 23s (top portion T) in the radial direction of the transmission belt 10. An end portion of the rocking edge portion 25 on the inner peripheral side of the transmission belt 10 (lower side in the figure, that is, the tapered surface 21s side) is positioned on the inner side of the saddle surface 23s (bottom portion) in the radial direction of the transmission belt 10. However, the rocking edge portion 25 may be formed so as to be only included in at least one of the pillar portion 22 and the trunk portion 21. The rocking edge portion 25 may be formed on the rear face of the element 20.

The non-contact portion 27 is a belt-shaped recessed portion that is formed on the front face (one of the surfaces) of the trunk portion 21 so as to open toward the saddle surface 23s, extend along the saddle surface 23s in the width direction, and divide the rocking edge portions 25. The surface (bottom surface) of the non-contact portion 27 is recessed to the rear face side with respect to the surface of the rocking edge portion 25. Thus, the thickness of the saddle surface 23a is less than the thickness to of the pillar portion 22. Corner portions of the non-contact portion 27 and edge portions of the trunk portion 21 that define the non-contact portion 27 are chamfered etc. so as to be rounded. By forming such a non-contact portion 27 in the element 20, it is possible to satisfactorily suppress contact with the adjacent element 20 in parts other than the rocking edge portion 25, that is, it is possible to satisfactorily suppress the adjacent element 20 from being in contact with the non-contact portion 27, in the transmission belt 10. As a result, it is possible to suppress a load from the center portion in the width direction of the element 20 on which a large moment acts from being applied to the adjacent element 20 and suppress the element 20 from being deformed, and thus, improve the durability of the element 20.

The saddle surface 23s of the element 20 described above will be described in detail below.

The width of the saddle surface 23s of the element 20 that includes the pillar portions 22 as described above (for example, 16 mm) is larger than a width of a saddle surface of a conventional element in which laminated rings are disposed on both sides of a head portion that is extended from a center portion of a trunk portion in a width direction toward a belt outer peripheral side (for example, around 9 mm). Depending on the curvature of the saddle surface 23s, stress (bending stress) that acts on the center portion of the laminated ring 12 in the width direction near the top portion T when a torque is transmitted with the transmission belt 10 is increased, compared to stress that acts on the end portions on both sides of the laminated ring 12. This results from the distance between the top portion T and the bottom portion of the saddle surface 23s being increased. Thus, there is a possibility that the durability of the laminated ring 12 is decreased, and hence the durability of the transmission belt 10 is decreased.

Figure 4:
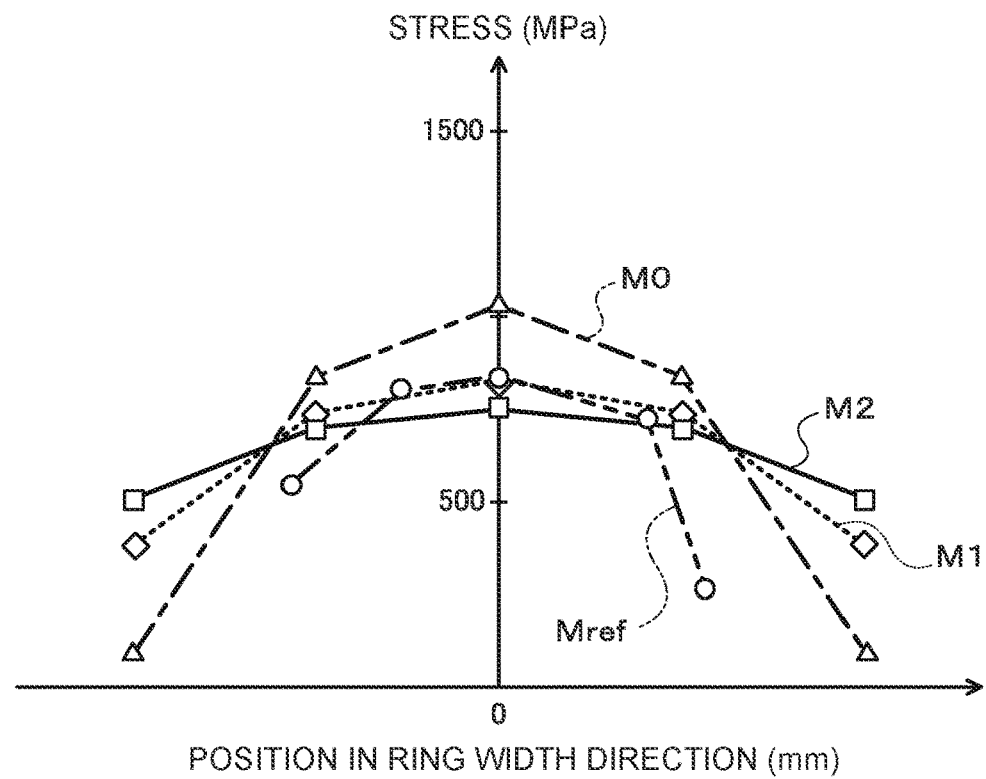
FIG. 4 is a graph of an analysis result of the stress distribution of a ring of the transmission belt.
Figure 5:
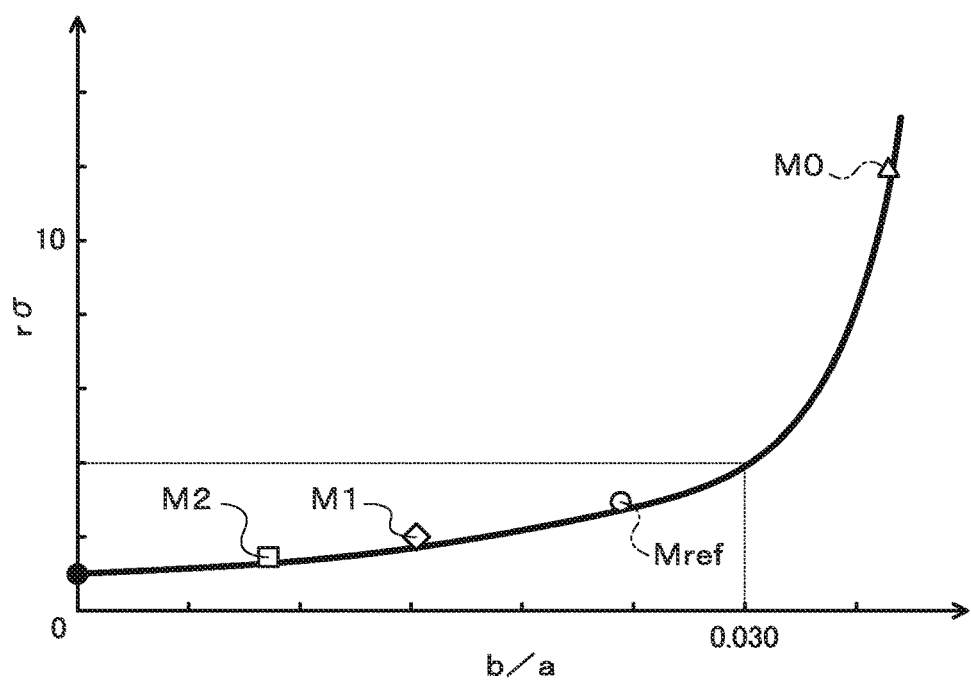
FIG. 5 is a graph of a correlation of a ratio between a long diameter and a short diameter of an elliptic arc that forms the saddle surface, and a ratio of a stress acting on a center portion to a stress acting on an end portion of the ring in a width direction of the ring.

In order to optimize the curvature of the saddle surface 23s of the element 20 including the pillar portions 22 and improve the durability of the transmission belt 10 and the laminated ring 12, models of elements were prepared in each of which the curvature of the saddle surface is varied. The stress that acts on the laminated ring when a torque is transmitted is calculated through analysis for each model. Suppose the speed ratio γ of the continuously variable transmission is at the maximum and a common maximum torque (for example, 180 Nm) is transmitted from the engine to the primary pulley. FIG. 4 illustrates an analysis result of the stress distribution of the laminated ring of the transmission belt including the models (elements) of such a case, in which the laminated ring is wound around the primary pulley. FIG. 5 illustrates a correlation of a ratio b/a of the long diameter a to the short diameter b of the elliptic arc ea that forms the saddle surface of the models (elements), and a ratio rσ of the stress that acts on the end portion to the stress that acts on the center portion of the laminated ring in the width direction. The ratio rσ can be acquired by dividing the stress that acts on the center portion of the laminated ring in the width direction by an average of the stress that acts on both end portions of the laminated ring in the width direction.

A model M0 in FIGS. 4 and 5 has a similar configuration to that of the element 20. In the model M0, the ratio b/a of the long diameter a to the short diameter b of the elliptic arc ea that forms the saddle surface is b/a=0.0361. A model M1 has the same configuration as that of the model M0 (element 20) except for the curvature of the saddle surface. In the model M1, the ratio b/a is b/a=0.0151. A model M2 has the same configuration as that of the models M0, M1 (element 20 described above) except for the curvature of the saddle surface. In the model M2, the ratio b/a is b/a=0.0085. A model Mref is an element that includes two saddle surfaces that are formed by the elliptic arc ea, on both sides of the head portion extended from the center portion of the trunk portion in the width direction toward the belt outer peripheral side. In the model Mref, the ratio b/a is b/a=0.0241.

Figure 6:
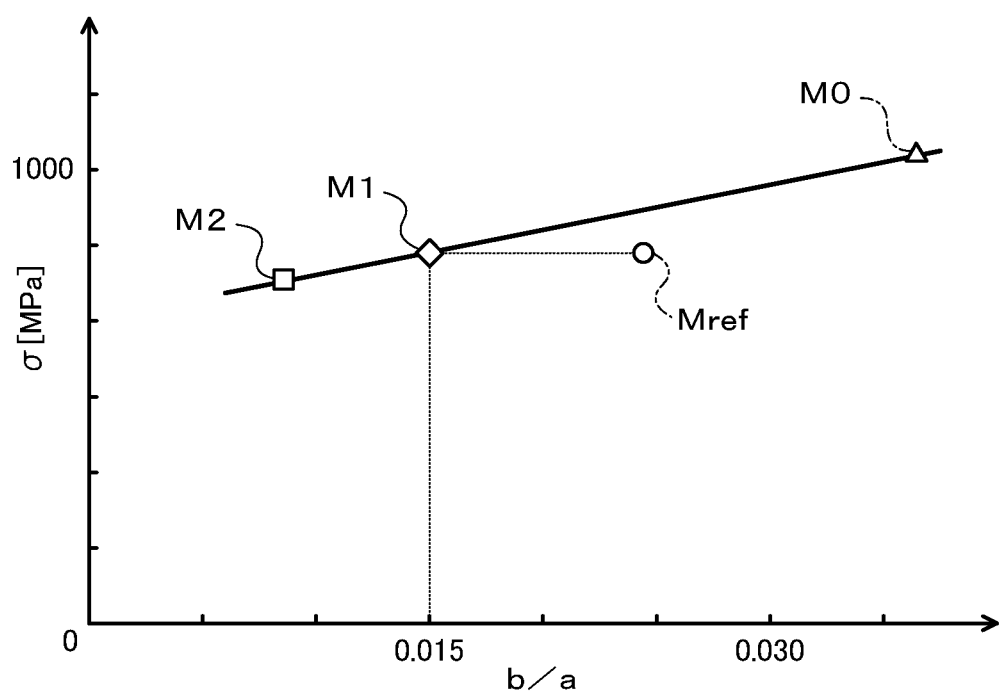
FIG. 6 is a graph of a correlation of the ratio between the long diameter and the short diameter of the elliptic arc that forms the saddle surface and a stress acting on the ring.

As it can be seen from FIGS. 4 and 5, in the models M0, M1, M2, and Mref, the stress that acts on a portion of the laminated ring when a torque is transmitted with the transmission belt is decreased as the portion is apart from the center portion and close to the end portions on both sides of the laminated ring in the width direction. In the transmission belt including the model M0 with the ratio b/a that is larger than that of the other models, the amount of stress (bending stress) that acts on the center portion of the laminated ring in the width direction near the top portion T reaches twelve times (rΣ≈12) the amount of stress that acts on the end portions of the laminated ring. In contrast, in the model M1 and the model M2 with relatively small ratios b/a, the amount of stress that acts on the center portion of the laminated ring in the width direction is equal to or less than two times (rσ≤2) the amount of the stress that acts on the end portions of the laminated ring. The ratios of the model M1 and the model M2 indicated values that are more satisfactory than that of the model Mref that corresponds to a conventional element. As it can be seen from a correlation curve in FIG. 5 acquired from the analysis results in FIG. 4, the ratio rσ decreases as the ratio b/a decreases. When the ratio b/a satisfies b/a≤0.03, the stress that acts on the center portion of the laminated ring is within a range that is practically acceptable. That is, the stress that acts on the center portion of the laminated ring is equal to or less than four times the amount of stress that acts on the end portions of the laminated ring. As illustrated in FIG. 6, when the ratio b/a satisfies b/a≤0.015, a stress σ that acts on the center portion of the laminated ring is equal to or less than a stress σ that acts on the center portion of the laminated ring in the model Mref.

According to the analysis results, it is understood that it is possible to suppress the distance between the top portion T and the bottom portion of the saddle surface 23s from becoming too large so as to optimize the stress distribution of the laminated ring 12 when a torque is transmitted with the transmission belt 10. This is made possible by setting the saddle surface 23s of the element 20 as a convex surface that is formed by the elliptic arc ea that satisfies b/a≤0.03, preferably b/a≤0.015, and more preferably b/a≤0.010. Based on the research carried out, it is found that it is possible to ensure a centripetal force toward the top portion of the saddle surface that is applied to the laminated ring from the saddle surface and satisfactorily center the laminated ring with respect to the element, by setting the ratio b/a equal to or more than 0.005, and more preferably equal to or more than 0.0075 even if the curvature of the saddle surface varies due to the manufacturing tolerance.

The saddle surface 23s of the element 20 of the embodiment is thus set as a convex surface that is formed by the elliptic arc ea in which the long diameter a and the short diameter b satisfy 0.005≤b/a≤0.03, preferably 0.005≤b/a≤0.015, and more preferably 0.0075≤b/a≤0.01. In this way, it is possible to optimize the stress distribution of the laminated ring 12 that is in contact with the saddle surface 23s so as to improve the durability of the laminated ring 12 and the transmission belt 10, and ensure a centripetal force that is applied to the laminated ring 12 from the saddle surface 23s more satisfactorily.

In the embodiment described above, the saddle surface 23s of the element 20 is formed by an elliptic arc. However, the saddle surface 23s is not limited to this. That is, the saddle surface 23s may be formed by an arc (a part of a perfect circle) or an approximate curve of an elliptic arc such as an n-th degree curve. In this case, the element 20 only needs to be formed so that the ratio b/a satisfies the relationship described above, the ratio b/a being a ratio of the long diameter a and the short diameter b of the elliptic arc approximated to the curve that forms the saddle surface 23s. Such an "approximate curve of an elliptic arc" is thus included in an "elliptic arc" of the embodiment. In the embodiment described above, the end portion on the outer peripheral side of the rocking edge portion 25 is positioned on the outer side of the saddle surface 23s (top portion T) in the radial direction of the transmission belt 10. The end portion on the inner side of the rocking edge portion 25 is positioned on the inner side of the saddle surface 23s (bottom portion) in the radial direction of the transmission belt 10. However, the rocking end portions 25 are not limited to this. That is, the rocking edge portion 25 may be formed so that the end portion on the outer peripheral side or the end portion on the inner peripheral side overlaps with a straight line Lt passing through the rocking edge portion 25 and the top portion T of the saddle surface 23s and extending in the width direction. The element 20 has an outer shape that is symmetrical. However, the outer shape of the element 20 is not limited to this. That is, the element 20 may be formed to have an outer shape that is asymmetrical.

In the transmission belt 10 described above, the hook portions 22f are provided in each element 20 and the retainer ring 15 is disposed between the laminated ring 12 and the hook portions 22f of the elements 20. However, the retainer ring 15 may be omitted from the transmission belt 10. The hook portions 22f are not limited to the configuration described above, and the hook portions 22f may be omitted. The continuously variable transmission 1 may be configured so that the primary shaft 2 and the secondary shaft 4 are selectively coupled to the input shaft and the primary shaft 2 and the secondary shaft 4 are selectively coupled to the drive shaft of the vehicle.

As described above, a transmission belt element of the disclosure is a transmission belt element (20) including: a trunk portion (21) having a saddle surface (23s) that is in contact with a ring (12) of a transmission belt (10) that is wound around a primary pulley (3) and a secondary pulley (5) of a continuously variable transmission (1); and a pair of pillar portions (22) extending from the trunk portion (21) so as to be positioned on both sides of the saddle surface (23s) in a width direction. Here, the saddle surface (23s) is a convex surface that is formed by an elliptic arc (ea) and satisfies b/a≤0.015 when a long diameter of the elliptic arc (ea) is regarded as "a" and a short diameter of the elliptic arc (ea) is regarded as "b".

As described above, it is possible to suppress the distance between the top portion and the bottom portion of the saddle surface from becoming too large so as to optimize the stress distribution of the ring when a torque is transmitted with the transmission belt. This is made possible by setting the saddle surface of the transmission belt element as the convex surface formed by the elliptic arc in which the long diameter a and the short diameter b satisfy b/a≤0.015. It is thus possible to optimize the stress distribution of the ring that is in contact with the saddle surface and improve the durability of the transmission belt. This is made possible by setting the saddle surface of the transmission belt element including the pillar portions as the convex surface formed by the elliptic arc in which the long diameter a and the short diameter b satisfy b/a≤0.015.

The transmission belt element (20) may satisfy 0.005≤b/a≤0.015 or may satisfy 0.0075≤b/a≤0.01. It is thus possible to optimize the stress distribution of the ring that is in contact with the saddle surface and ensure the centripetal force applied to the ring from the saddle surface more satisfactorily.

The amount of stress that acts on a center portion of the ring (12) may be equal to or less than four times the amount of stress that acts on an end portion of the ring (12). That is, it is possible to further improve the durability of the transmission belt and the ring by setting the amount of stress that acts on the center portion of the ring to be equal to or less than four times the amount of stress that acts on the end portions of the ring. This is made possible by setting the saddle surface as a convex surface formed by an elliptic arc in which the long diameter a and the short diameter b satisfy b/a≤0.03.

The transmission belt element (20) may include a rocking edge portion (25) that is formed on one of a front face and a rear face and that is a curved surface including a contact line at which adjacent elements (2) are in contact with each other and which serves as a fulcrum of rotation of the adjacent elements (2). An end portion of the rocking edge portion (25) on an outer peripheral side of the transmission belt (10) may be positioned on an outer side of the saddle surface (23s) in a radial direction of the transmission belt (10). An end portion of the rocking edge portion (25) on an inner peripheral side of the transmission belt (10) may be positioned on an inner side of the saddle surface (23s) in the radial direction.

A long axis (La) of the elliptic arc (ea) may extend in the width direction and a short axis (Ma) of the elliptic arc (ea) may extend through a center of an element (20) in the width direction.

The transmission belt of the disclosure is a transmission belt (10) that is wound around a primary pulley (3) and a secondary pulley (5) of a continuously variable transmission (1), the transmission belt (10) including: a plurality of elements (20) each including a trunk portion (21) having a saddle surface (23s), and a pair of pillar portions (22) extending from the trunk portion (21) so as to be positioned on both sides of the saddle surface (23s) in a width direction; and a ring (12) disposed between the pillar portions (22) of the elements (20) so as to be in contact with the saddle surfaces (23s). Each of the saddle surfaces (23s) of the elements (20) is a convex surface that is formed by an elliptic arc (ea) and satisfies b/a≤0.015 when a long diameter of the elliptic arc (ea) is regarded as "a" and a short diameter of the elliptic arc (ea) is regarded as "b".

In this way, the saddle surface of the element including the pillar portions is set as the convex surface formed by the elliptic arc in which the long diameter a and the short diameter b satisfy b/a≤0.015. It is thus possible to optimize the stress distribution of the ring that is in contact with the saddle surface and improve the durability of the transmission belt.

It should be understood that the present disclosure is not limited in any way to the above embodiments, and various modifications can be made within the spirit and scope of the present disclosure. Furthermore, the embodiments described above are merely specific forms of the various aspects of the invention described in the "SUMMARY OF THE DISCLOSURE" section, and do not limit the elements of those aspects described in the "SUMMARY OF THE DISCLOSURE" section.

INDUSTRIAL APPLICABILITY

The various aspects according to the disclosure are applicable to the manufacturing industry of continuously variable transmissions and transmission belts, etc.

The invention claimed is:

1. A transmission belt element comprising: a trunk portion having a saddle surface that is in contact with a ring of a transmission belt that is wound around a primary pulley and a secondary pulley of a continuously variable transmission; and a pair of pillar portions extending from the trunk portion so as to be positioned on both sides of the saddle surface in a width direction, wherein
the saddle surface is a convex surface that is formed by an elliptic arc and satisfies b/a≤0.015 when a long diameter of the elliptic arc is regarded as "a" and a short diameter of the elliptic arc is regarded as "b".

2. The transmission belt element according to claim 1, wherein 0.005≤b/a≤0.015 is satisfied.

3. The transmission belt element according to claim 2, wherein 0.0075≤b/a≤0.01 is satisfied.

4. The transmission belt element according to claim 1, wherein 0.0075≤b/a≤0.01 is satisfied.

5. The transmission belt element according to claim 1, wherein an amount of bending stress that acts on a center portion of the ring is equal to or less than four times an amount of bending stress that acts on an end portion of the ring.

6. The transmission belt element according to claim 1, wherein
a rocking edge portion that is formed on one of a front face and a rear face and that is a curved surface including a contact line at which adjacent transmission belt elements are in contact with each other and which serves as a fulcrum of rotation of the adjacent transmission belt elements is provided, and
an end portion of the rocking edge portion on an outer peripheral side of the transmission belt is positioned on an outer side of the saddle surface in a radial direction of the transmission belt, and an end portion of the rocking edge portion on an inner peripheral side of the transmission belt is positioned on an inner side of the saddle surface in the radial direction.

7. The transmission belt element according to claim 1, wherein a long axis of the elliptic arc extends in the width direction and a short axis of the elliptic arc extends through a center of each transmission belt element in the width direction.

8. The transmission belt according to claim 7, wherein the ring of the transmission belt is laminated ring; and the transmission belt element includes a single ring housing portion that is defined between the pair of pillar portions so as to open toward a free end side of each pillar portion.

9. The transmission belt element according to claim 1, wherein the ring of the transmission belt is laminated ring; and the transmission belt element includes a single ring housing portion that is defined between the pair of pillar portions so as to open toward a free end side of each pillar portion.

10. A transmission belt that is wound around a primary pulley and a secondary pulley of a continuously variable transmission, the transmission belt comprising: a plurality of elements each including a trunk portion having a saddle surface, and a pair of pillar portions extending from the trunk portion so as to be positioned on both sides of the saddle surface in a width direction; and a ring disposed between the pair of pillar portions of the plurality of elements so as to be in contact with the saddle surfaces, wherein
each of the saddle surfaces of the plurality of elements is a convex surface that is formed by an elliptic arc and satisfies b/a≤0.015 when a long diameter of the elliptic arc is regarded as "a" and a short diameter of the elliptic arc is regarded as "b".

* * * * *